Figure 1:
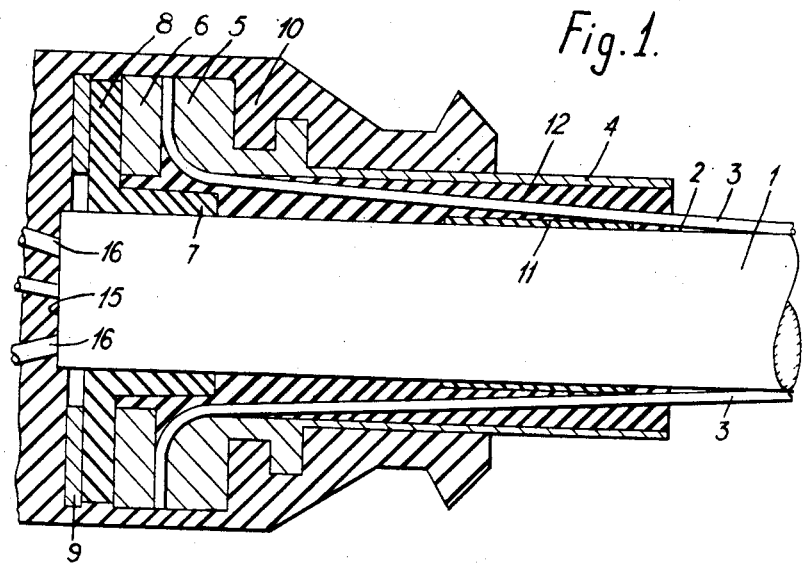

June 7, 1960    F. A. HARWOOD    2,939,906
MOULDED CABLE COUPLINGS
Filed May 13, 1958

Inventor
FREDERICK ARTHUR HARWOOD
By Webb, Mackey
+ Burden
Attorney

United States Patent Office 2,939,906
Patented June 7, 1960

2,939,906

MOULDED CABLE COUPLINGS

Frederick Arthur Harwood, Maghull, England, assignor to British Insulated Callender's Cables Limited, London, England, a British company Filed May 13, 1958, Ser. No. 735,054

8 Claims. (Cl. 174—77)

This invention relates to a method of forming a body of insulating material upon a cylindrical member in such a manner as to minimise penetration of moisture between the body of insulating material and the cylindrical member. The invention has been developed in connection with the production of an armouring seal for an electric cable having a cylindrical plastics sheath and over the sheath a metal armouring consisting of a layer of wires or a metal braid or other circumferentially discontinuous metal layer. We have found that when forming a body of insulating material in situ upon the plastics sheath by a casting or moulding operation with the object of preventing penetration of moisture between the sheath and the cast or moulded body, shrinkage occurring upon the solidifying of the casting or moulding material may result in the drawing away of the material from the plastics sheath at some place or places and thereby providing a path between the casting or moulding and the sheath along which moisture may penetrate from one side of the casting or moulding to the other. It is an object of the present invention to provide an improved method whereby the risk of penetration of moisture between the cast or moulded body of insulating material and the plastics sheath is minimised.

According to the present invention the improved method comprises applying directly to a cylindrical member a sleeve of elastomeric material which is an expanded fit on the cylindrical member and applying insulating material around and in contact with the sleeve of elastomeric material to form a casting or moulding which adheres to at least a complete annular part of the sleeve.

Should it be found that the shrinkage of the insulating material upon solidifying results in the insulating material, which adheres to the elastomeric sleeve, drawing the sleeve away from the cylindrical member at some point or points of the circumference of the cylindrical member, an annular portion of the external surface of the elastomeric sleeve may be treated with a film of adhesion-inhibiting material so that there will be a complete annular portion of the sleeve over which the casting or moulding does not adhere so that that annular portion of the sleeve is left an expanded fit on the cylindrical member, although the sleeve at some other part or parts of its circumference may be drawn away from the cylindrical member. Where such an adhesion-inhibiting material is used, it is preferred to apply it to an annular part of the external surface of the elastomeric sleeve away from the ends of the sleeve, for example, an annular part which is central or approximately central of the length of the sleeve. After the treatment of the sleeve with the adhesion-inhibiting material, the body of insulating material is formed by a casting or moulding operation.

The cylindrical member around which the body of insulating material is cast or moulded need not necessarily be an electric cable sheath of course, but may be some other member which may be hollow or solid and it may be a plastics or a metal body. Various elastomeric materials may be used for the sleeve so long as the cast or moulded material will adhere to them. For the forming of the cast or moulded body an organic synthetic resin will be used generally.

Figure 2A:
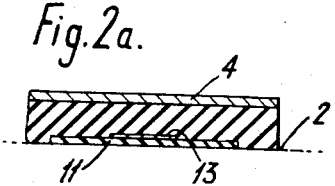
Figure 2B:
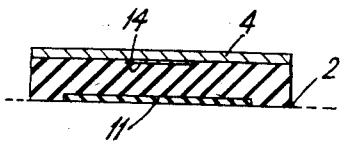

The invention has been developed in connection with the manufacture of an armouring seal for an electric cable and one form of construction of such device will now be described with the aid of the accompanying drawings, of which Figure 1 is a longitudinal section with certain parts shown broken away and Figures 2(a) and 2(b) are fragmentary views in section of certain details.

Referring to Figure 1, an electric cable 1 has a plastics cable sheath 2 provided with a circumferentially discontinuous metal armouring layer composed of a number of wires 3 applied helically to the plastics cable sheath 2. The latter may be made, for example, of polyethylene, polyvinyl chloride or other thermoplastic composition. Spaced from the cable sheath 2 is a cylindrical metal sleeve 4 provided at one end with a metal ring 5 for co-operating with a metal ring 6 between which the ends of the armouring wires 3 are clamped. The diameters of the apertures in the rings 5 and 6 are substantially equal to the internal diameter of the metal sleeve 4, the two rings thus being spaced from the surface of the plastics cable sheath 2. A closely fitting bush 7 of insulating material surrounds the cable sheath 2 and has a flange 8 which is gripped between the metal ring 6 and a metal ring 9 surrounding and spaced from the cable sheath. The rings 5, 6 and 9 are held together in any suitable manner by means not shown and are embedded in a moulded body 10 of insulatng material which extends over the ends of the armouring wires 3 and over a portion of the metal sleeve 4 which may be made, for example, of brass or aluminium.

The inner surfaces of the rings 5, 6 and 9 and the moulded body 10 of insulating material co-operate with the ends of the armouring wires 3 to form a chamber which is sealed against the entry of moisture at that part of the cable 1 at which the rings and bush are located. The armouring wires 3 extend from a place outside the end of the metal sleeve 4 remote from the ring 5, through the annular space between the metal sleeve and the surface of the plastics cable sheath 2, to the ring 5, the armouring wires extending across the annular space 1.

Difficulty has been found hitherto in casting or moulding a body of insulating material extending across the annular space between the external surface of the plastics cable sheath 2 and the inner surface of the metal sleeve 4 in such a manner as to prevent penetration of moisture between the cast or moulded body and the surface of the plastics cable sheath. It has been found, for example, that if a body of a cold setting resin is cast or moulded in situ upon the plastics cable sheath 2 to fill the annular space between the metal sleeve 4 and the plastics cable sheath, the cold setting resin in solidifying shrinks away from the cable sheath towards the sleeve so that although the resin adheres to the internal surface of the metal sleeve, there is a moisture path formed between the cast or moulded body and the adjacent part of the surface of the plastics cable sheath 2. It has been found that the risk of moisture penetration between the plastics cable sheath and the moulded or cast body of insulating material can be reduced to a large extent by applying directly to the plastics cable sheath 2 a sleeve 11 of elastomeric material, for example of a vulcanised natural or synthetic rubber. Preferably, however, the sleeve is of polychloroprene. The sleeve 11 is shown as lying wholly within the metal sleeve 4 and although this is the preferred arrangement, a part of the sleeve 11 could lie outside the metal sleeve 4. The sleeve 11 is made of somewhat smaller diameter than the external diameter of the plastics cable sheath 2 so that the sleeve of elastomeric material is an expanded fit upon the cable sheath. As will be seen from Figure 1 the armouring wires 3 extend over the sleeve 11. An organic synthetic resin is then moulded or cast around the sleeve 11 of elastomeric material to form a moulded or cast body 12 which fills the annular space between the sleeve 11 and the surrounding part of the metal sleeve 4. The organic synthetic resin, which will be, generally, an epoxy-based resin compound, adheres to the external surface of the sleeve 11 of elastomeric material and also to the surrounding part of the inner surface of the metal sleeve 4 and thus provides a barrier to the penetration of moisture through the adjacent end of the metal sleeve 4. If it is found in some cases that the shrinkage of the insulating material used to form the cast or moulded body 12 is such as to draw the sleeve 11 of the elastomeric material away from the surface of the plastics cable sheath 2 at some part or parts of the circumference of the latter and thereby provide the possibility of the formation of a moisture path between the sleeve 11 and the metal sleeve 4, it is possible to avoid this by applying to an annular part of the external surface of the sleeve 11 or to an annular portion of the surrounding part of the internal surface of the metal sleeve 4, a thin film of an adhesion-inhibiting material. This film must, however, form a complete annulus to avoid the formation of a path through which moisture can pass between the plastics cable sheath 4 and the cast or moulded body of epoxy resin. If the adhesion-inhibiting material, for example, a silicone-based oil or grease is applied to an annular part of the sleeve 11 it is preferably applied to the central part of the length of that sleeve, assuming that the whole of the length of the sleeve lies within the metal sleeve 4. The central part of the sleeve 11 can then remain an expanded fit on the cable sheath 2 even although end portions of the sleeve 11 are drawn away from the surface of the plastics cable sheath at some part or parts of the circumference of the latter. Preferably the treated portion of the external surface of the elastomeric sleeve 11 or of the internal surface of the metal sleeve 4 is an annulus or ring the central plane of which is at right angles to the longitudinal axis of the sleeve.

In Figure 2(a) the reference numeral 13 is intended to indicate a film of adhesion-inhibiting material applied to the central part of a sleeve 11 of elastomeric material, the film forming a complete annulus around the external surface of the sleeve 11. In Figure 2(b) the reference numeral 14 indicates a film of adhesion-inhibiting material applied to a portion of that part of the internal surface of the metal sleeve 4 surrounding the sleeve 11, the film again forming a complete annulus around the internal surface of the metal sleeve. In Figures 2(a) and 2(b) the thickness of the films 12 and 14 has been exaggerated for the sake of clearness.

The following is a specific example. A sleeve of neoprene having a length of one and a half inches, a wall thickness of three sixty-fourths of an inch and an internal diameter of 0.375 inch was applied to a cylindrical body of polyvinyl chloride having an overall diameter of 0.600 inch so that the sleeve was an expanded fit on the cylindrical body, the latter being an electric cable sheath. When the sleeve was applied to the sheath, its wall thickness was reduced to one thirty-second inch. The neoprene sleeve lay wholly within an outer metal sleeve having an internal diameter of 0.928 inch and into the annular space between the outer metal sleeve and the cable sheath was injected a cold-setting epoxy-based resin compound to form a cast body of insulating material. It was found that the cast body formed an effective barrier against moisture penetration. The resin compound contained a shrinkage-reducing material, for example, silica sand or mica flour. When using an adhesion-inhibiting material any silicone-based oil or grease is suitable but other inhibitors can be used, for example, carnauba wax. With regard to the proportion of the external surface of the elastomeric sleeve treated with the adhesion-inhibiting material, if the dimension of the annulus so treated in a direction parallel with the axis of the sleeve is regarded as the width of the treated area, then the width may be about one third of the total length of the sleeve. The annulus forming the treated area will usually have its central plane at right angles to the sleeve axis.

As indicated above the invention is applicable to cases where it is required to minimise the risk of penetration of moisture between a body of insulating material cast or moulded on to a cylindrical member. The latter may be a thermoplastic material, for example, polyvinyl chloride, polyethylene or polystyrene, or it could be a thermosetting material, for example, a formaldehyde condensation product. The cylindrical member could be of metal. For the forming of the cast or moulded body an organic synthetic resin would be used. This could be a cold setting compound or one setting with the application of heat. We have found epoxy-based resin compounds to be suitable and have obtained satisfactory results using such resins known under the trade names of Epikote and Araldite. We prefer to use epoxy-based resin compounds which are cold setting and we have found that good adhesion can be obtained between those resins and an elastomeric sleeve of neoprene.

The invention is particularly useful for the production of moulded electric cable coupling parts where it is necessary to prevent the passage of moisture into the interior of the coupling part between a plastics cable sheath and a surrounding metal sleeve having a clamping part for armouring wires or a metal braid surrounding the cable sheath and extending through the space between the cable sheath and the metal sleeve. The armouring seal illustrated in Figure 1 may form part of a moulded coupling part by soldering pin or socket contacts to the ends of cable conductors projecting beyond a cut-back end 15 of the cable 1, the reference numeral 16 indicating insulated cable conductors projecting beyond that end of the cable. The invention may be used, for example, in the production of moulded multiple pin and socket coupling parts of the kind described and claimed in the specification of our British Patent 715,649.

What I claim as my invention is:

1. An armouring seal for an electric cable having a cylindrical plastics sheath and a metal sleeve surrounding and spaced from the sheath and having a clamping part at one end and a circumferentially discontinuous metal armouring around the sheath and extending from the latter through the space between the sheath and the metal sleeve to the clamping part, a sleeve of elastomeric material surrounding the sheath and having an expanded fit thereon and lying at least in part within the metal sleeve and an annular solid body of an organic synthetic resin extending from the sleeve of elastomeric material to the metal sleeve and adhering to at least an annular portion of each of the two sleeves.

2. An armouring seal according to claim 1, wherein the annular solid body of organic synthetic resin has an outer surface of which an annular portion is non-adherent to the neighbouring part of the internal surface of the metal sleeve.

3. An armouring seal according to claim 1, wherein the annular solid body of organic synthetic resin has an inner surface of which an annular portion is non-adherent to the neighbouring part of the external surface of the sleeve of elastomeric material.

4. An armouring seal according to claim 1, wherein the sleeve is of polychloroprene and the annular solid body is an epoxy-based resin compound.

5. Means minimising penetration of moisture into the space between a cylindrical member and a metal sleeve surrounding and spaced from the cylindrical member, said means comprising in combination, a sleeve of elastomeric material surrounding and in contact with the cylindrical member and having an expanded fit thereon and lying at least in part within the metal sleeve and a solid body of insulating material surrounding the sleeve of elastomeric material and in contact with the external surface thereof and with the internal surface of the metal sleeve and adhering to at least a complete annular part of the external surface of the sleeve of elastomeric material and to at least a complete annular part of the internal surface of the metal sleeve.

6. Means minimising penetration of moisture into the space between a cylindrical member and a metal sleeve surrounding and spaced from the cylindrical member, said means comprising in combination, a sleeve of elastomeric material having an expanded fit thereon and lying at least in part within the metal sleeve, a solid body of insulating material surrounding the sleeve of elastomeric material, a film of adhesion-inhibiting material on the appropriate surface of at least one of the sleeves, the solid body of insulating material adhering to at least a complete annulus of the sleeve of elastomeric material and to at least a complete annulus of the metal sleeve.

7. Means minimising penetration of moisture into the annular space between a plastics cylindrical member and a metal sleeve surrounding and spaced from the cylindrical member, said means comprising in combination a rubber sleeve surrounding and in contact with the cylindrical member and having an expanded fit thereon, the sleeve lying at least partly within the metal sleeve and a solid body of an epoxy based resin compound surrounding and in contact with the rubber sleeve and with the metal sleeve and adhering to at least a complete annular part of each of the two sleeves.

8. Means minimising penetration of moisture into the annular space between a plastics cylindrical member and a metal sleeve surrounding and spaced from the cylindrical member, said means comprising in combination a sleeve of polychloroprene surrounding and in contact with the cylindrical member and having an expanded fit thereon, the polychloroprene sleeve lying at least partly within the metal sleeve and a solid body of an organic synthetic resin surrounding and in contact with the polychloroprene sleeve and with the metal sleeve and adhering to at least a complete annulus of each sleeve.

References Cited in the file of this patent

UNITED STATES PATENTS 2,737,543    Irwin et al.  --------------- Mar. 6, 1956

FOREIGN PATENTS 665,787    Great Britain ------------- Jan. 3, 1952
522,607    Belgium --------------- Nov. 25, 1955